(12) United States Patent
Afzali-Ardakani et al.

(10) Patent No.: US 8,084,012 B2
(45) Date of Patent: Dec. 27, 2011

(54) SELECTIVE PLACEMENT OF CARBON NANOTUBES THROUGH FUNCTIONALIZATION

(75) Inventors: Alina Afzali-Ardakani, Ossining, NY (US); Phaedon Avouris, Yorktown Heights, NY (US); James B. Hannon, Mahopac, NY (US); Christian Klinke, Ettlingen (DE)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 12/541,748

(22) Filed: Aug. 14, 2009

(65) Prior Publication Data
US 2009/0301349 A1 Dec. 10, 2009

Related U.S. Application Data

(62) Division of application No. 11/324,441, filed on Jan. 3, 2006.

(51) Int. Cl.
*C09C 1/56* (2006.01)
(52) U.S. Cl. ............ 423/460; 423/447.2; 209/274; 977/742; 977/847
(58) Field of Classification Search ............ 423/447.2, 423/445 B, DIG. 40, 460; 977/742, 746, 977/748, 847; 209/274
See application file for complete search history.

(56) References Cited

U.S. PATENT DOCUMENTS

| | | | |
|---|---|---|---|
| 6,207,809 B1 | 3/2001 | Nestler | |
| 6,656,712 B1 * | 12/2003 | Balavoine et al. | 435/176 |
| 7,384,815 B2 | 6/2008 | Tour et al. | |
| 2002/0127171 A1 | 9/2002 | Smalley et al. | |
| 2004/0001778 A1 | 1/2004 | Chen et al. | |
| 2004/0071624 A1 | 4/2004 | Tour et al. | |
| 2004/0241896 A1 | 12/2004 | Zhou et al. | |
| 2005/0265914 A1 * | 12/2005 | Gu et al. | 423/445 B |
| 2006/0057290 A1 | 3/2006 | Glatkowski | |
| 2006/0233713 A1 | 10/2006 | MacQueen | |
| 2008/0063587 A1 | 3/2008 | Strano et al. | |
| 2009/0232724 A1 | 9/2009 | Afzali-Ardakani et al. | |

FOREIGN PATENT DOCUMENTS

WO 2004/007364 1/2004

(Continued)

OTHER PUBLICATIONS

Yoo et al., "Self-Assembly of Functionalized Single-Walled Carbon Nanotubes Prepared From Aryl Diazonium Compounds on Ag Surfaces," Materials Letters, 2006, pp. 3224-3226, vol. 60.

(Continued)

*Primary Examiner* — Stuart Hendrickson
*Assistant Examiner* — Richard M Rump
(74) *Attorney, Agent, or Firm* — Scully, Scott, Murphy & Presser, P.C.; Vazken Alexanian

(57) ABSTRACT

The present invention provides a method for selectively placing carbon nanotubes on a substrate surface by using functionalized carbon nanotubes having an organic compound that is covalently bonded to such carbon nanotubes. The organic compound comprises at least two functional groups, the first of which is capable of forming covalent bonds with carbon nanotubes, and the second of which is capable of selectively bonding metal oxides. Such functionalized carbon nanotubes are contacted with a substrate surface that has at least one portion containing a metal oxide. The second functional group of the organic compound selectively bonds to the metal oxide, so as to selectively place the functionalized carbon nanotubes on the at least one portion of the substrate surface that comprises the metal oxide.

19 Claims, 9 Drawing Sheets

FOREIGN PATENT DOCUMENTS

| WO | WO 2004007364 A1 * | 1/2004 |
|---|---|---|
| WO | 02/49684 | 6/2004 |
| WO | 2006/081040 | 8/2006 |

OTHER PUBLICATIONS

Bahr et al., "Highly Functionalized Carbon Nanotubes Using in Situ Generated Diazonium Compounds," Chem. Mater., 2001, pp. 3823-3824, vol. 13.

Bahr et al., "Covalent Chemistry of Single-Wall Carbon Nanotubes," J. Mater. Chem., 2042, pp. 1952-1958, vol. 12.

McEuen, et al., "Single-walled carbon nanotube electronics", IEEE Trans Nanotechnol. 1, pp. 78-85 (2002).

Avouris, et al., "Carbon Nanotube Electronics", Proceed. IEEE 91, pp. 1772-1784 (2003).

Bonard, et al., "Carbon nanotube films as electron field emitters", Carbon 40, pp. 1715-1728, (2002).

Avouris, "Carbon Nanotube Electronics and Optoelectronics", MRS Bull. 29, pp. 403-410 (2004).

Javey, et al., "Ballistic Carbon Nanotube Field Effect Transistors", Nano Lett. 4, pp. 447-450 (2004).

Lin, et al., "High-performance carbon nanotube transistor with tunable polarity", IEEE Trans. Nanotechnol. 4, pp. 481-489 (2005).

Auvray, et al., "Chemical Optimization of Self-Assembled Carbon Nanotube Transistors", Nano Lett. 5, pp. 451-455 (2005).

Choi, et al., "Controlled deposition of carbon nanotubes on a patterned substrate", Surf. Sci. 462, pp. 195-202 (2000).

Johnston, et al., "Electronic devices based on purified carbon nanotubes grown by high-pressure decomposition of carbon monoxide", Nat. Mater, 4, pp. 589-592 (2005).

Hannon, et al., "Selective Placement of Carbon Nanotubes on Metal-Oxide Surfaces", Langmuir 21, pp. 8569-8571 (2005).

Bahr, et al., "Functionalization of Carbon Nanotubes by Electrochemical Reduction of Aryl Diazonium Salts: A Bucky Paper Electrode", J. Am. Chem. Soc. 123, pp. 6536-6542 (2001).

Kooi, et al., "Electrochemical Modification of Single Carbon Nanotubes", Agnew. Chem. Int. Ed. 41, pp. 1353-1355 (2002).

Niyogi, et al., "Chemistry of Single-Walled Carbon Nanotubes", Ace. Chem. Res. 35, pp. 1105-1113 (2002).

Heald, et al., "Chemical Derivatisation of Multiwalled Carbon Nanotubes Using Diazonium Salts", Chem. Phsy. Chem. 5, pp. 1794-1799 (2004).

Banerjee, et al., "Covalent surface chemistry of single-walled carbon nanotubes", Adv. Mater. 17, pp. 17-29 (2005).

Folkers, et al., "Self-Assembled Monolayers of Long-Chain Hydroxamic Acids on the Native Oxide of Metals" Languir 11, pp, 813-824 (1995).

Kataura, et al., "Optical properties of single-wall carbon nanotubes", Synth. Met. 103, pp. 2555-2558 (1999).

Spataru, et al., "Excitonic Effects and Optical Spectra of Single-Walled Carbon Nanotubes", Phys. Rev. Lett. 92, pp. 077402 (2004).

Perebeinos, et al., "Scaling of Excitons in Carbon Nanotubes", Phys. Rev. Lett. 92, 257402 (2004).

Chen, et al., "The Role of Metal-Nanotube Contact in the Performance of Carbon Nanotube Field-Effect Transistors", Nano Lett. 5, pp. 1497-1502 (2005).

Dyke, et al., "Unbundled and Highly Functionalized Carbon Nanotubes from Aqueous Reactions", Nano Lett. 3, pp. 1215-1218 (2003).

Lee, et al., "Band Structure and Quantum Conductance of Nanostructures from Maximally Localized Wannier Functions: The Case of Functionalized Carbon Nanotubes", Phys. Rev. Lett. 95, 076804 (2005).

Wind, et al., "Transistor structures for the study of scaling in carbon nanotubes", J. Vac. Sci. Technol. B 21, pp. 2856-2859 (2003).

Radosavljevic, et al., "Drain voltage scaling in carbon nanotube transistors", Appl. Phys. Lett. 83, pp. 2435-2437 (2003).

Apenzeller, et al., "Band-to-Band Tunneling in Carbon Nanotube Field-Effect Transistors", Phys. Rev. Lett. 93, 196805 (2004).

Martel, et al., "Ambipolar Electrical Transport in Semiconducting Single-Wall Carbon Nanotubes", Phys. Rev. Lett. 87, 256805 (2001).

Derycke, et al., "Controlling doping and carrier injection in carbon nanotube transistors", Appl. Phys. Lett. 80, pp. 2772-2775 (2002).

Chen, et al., "Self-aligned carbon nanotube transistors with charge transfer doping", Appl. Phys. Lett. 86, 123108 (2005).

Klinke, et al., "Charge transfer induced polarity switching in carbon nanotube transistors", Nano Lett. 5, pp. 555-558(2005).

Collins, et al., "Engineering Carbon Nanotnbes and Nanotube Circuits Using Electrical Breakdown", Science 292, pp. 706-709 (2001).

Martinez, "Sensitivity of single wall carbon nanotubes to oxidative process: structural modification, intercalation and functionalism" 2003 Carbon 41 pp. 2247-2256.

European Official Action dated Dec. 20, 2010.

Ashley et al., "The Chemotherapy of Schistosomiasis. Part II. Some Ethers of p-Aminophenol", Journal of the Chemical Society, 897-906, 1959 .

Office Action received in a related U.S. Patent Application, namely U.S. Appl. No. 12/541,758.

* cited by examiner

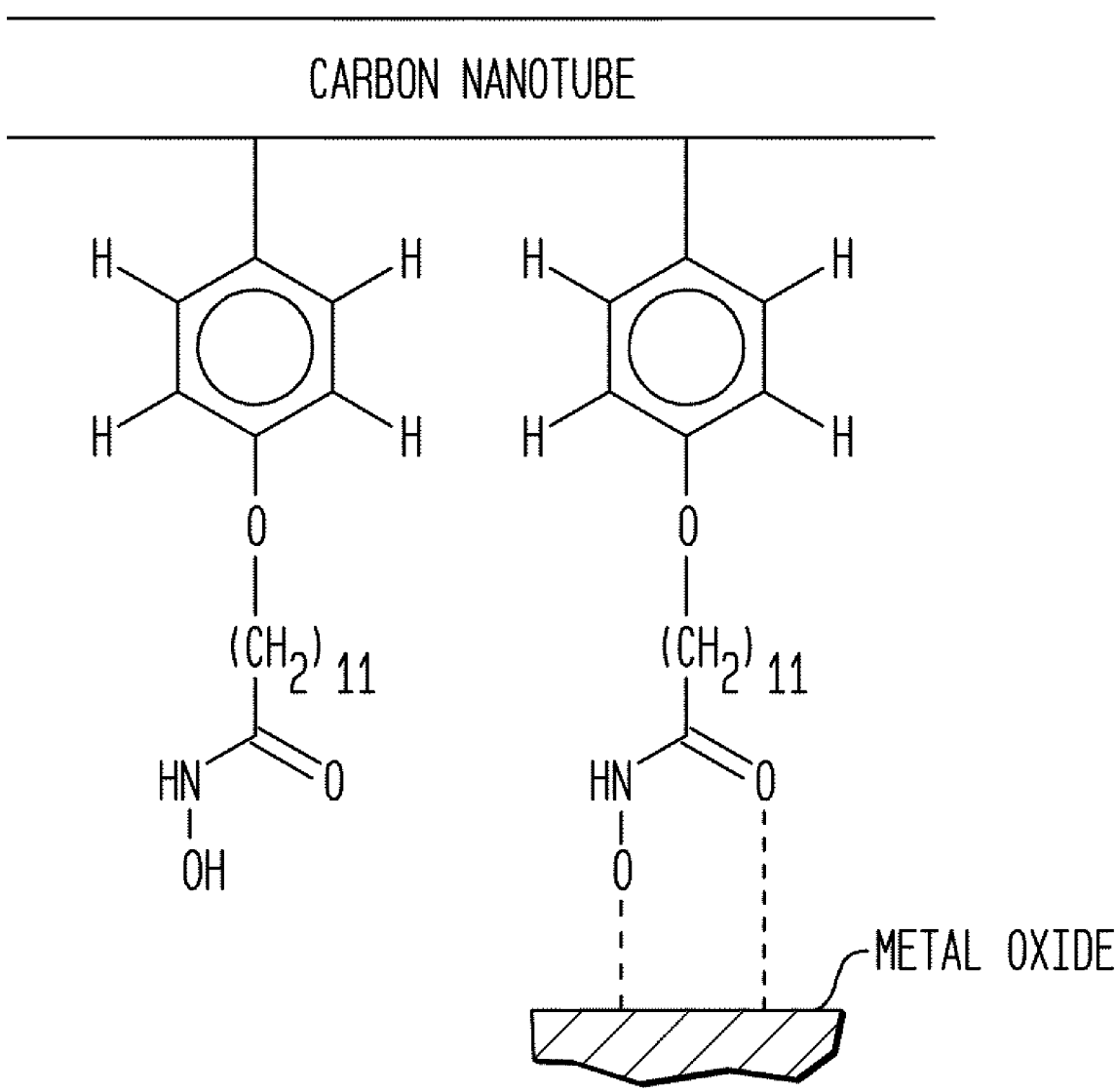

SELECTIVE PLACEMENT OF CARBON NANOTUBES THROUGH FUNCTIONALIZATION

RELATED APPLICATIONS

This application is a divisional of U.S. application Ser. No. 11/324,441, filed Jan. 3, 2006.

FIELD OF THE INVENTION

The present invention generally relates to the selective placement of carbon nanotubes on a particular surface. More particularly, the present invention provides a method that uses functionalized carbon nanotubes capable of selectively bonding to surfaces that comprise a metal oxide. The present invention also relates to compositions that contain such functionalized carbon nanotubes, as well as materials that can be used for forming such functionalized carbon nanotubes.

BACKGROUND

In the field of molecular electronics, few materials show as much promise as carbon nanotubes that comprise hollow cylinders of graphite that have a diameter of a few Angstroms. Carbon nanotubes have excellent electrical properties, which make them attractive for applications in nanotechnology.

Semiconducting carbon nanotubes, in particular, have received attention, due to their promising performance in electronic devices, such as diodes and transistors. For example, semiconducting carbon nanotubes can be used as channels in field effect transistors (FETs). Therefore, semiconducting carbon nanotubes are considered to be one of the most promising candidate materials for making nano-sized semiconductor circuits.

The most common prior art method of fabricating carbon nanotube FETs starts with depositing a carbon nanotube on a thin oxide film from a liquid suspension. Source and drain contacts are then formed lithographically on the nanotube to form a FET device.

An exemplary prior art carbon nanotube FET device 10 is illustratively shown in FIG. 1. Specifically, the bulk Si substrate 12 functions as a back gate. The thin oxide film 14, onto which the carbon nanotube 18 is deposited, functions as the gate dielectric. Source and drain contacts 16a and 16b are formed over the gate dielectric 14 at two terminal ends of the carbon nanotube 18. In this manner, the carbon nanotube 18 bridges between the source and drain contacts 16a and 16b, so it can function as the channel in the FET device 10.

The deposition of carbon nanotubes on an oxide surface, followed by lithographic patterning of the source and drain contacts, has been successfully used in the prior art for the construction of single carbon nanotube FETs. However, fabrication of integrated circuits from nanotubes requires the precise placement and alignment of large numbers of carbon nanotubes on a surface (e.g., spanning the source and drain contacts). E. Valentin, et al., "High-density selective placement methods for carbon nanotubes", Microelectronic Engineering, 61-62 (2002), pp. 491-496 disclose a method in which the adhesion of carbon nanotubes onto a $SiO_2$ surface is improved using aminopropyltriethoxysilane (APTS). In this prior art, APTS is employed to form a silanized surface on $SiO_2$, which is then used to selectively place the carbon nanotubes.

As known to those skilled in the art, $SiO_2$ and other oxides of non-metals are acidic oxides which form acids when combined with water. Such oxides are known to have low isoelectric points. The term "isoelectric point" is used throughout the present application to denote the pH at which the net charge on the oxide molecule is zero.

A drawback with the prior art process disclosed in the E. Valentin, et al. article is that the trialkoxysilane undergoes polymerization in solution and self-assembly must be carried out under controlled conditions excluding water. Additionally, APTS cannot be printed using conventional poly(dimethylsiloxane) (PDMS) stamps in contact printing because the solvents that are used for APTS could swell and destroy such stamps.

In view of the above, there is a continuing need for a method in which carbon nanotubes can be selectively placed on substrate surfaces, while avoiding the drawbacks of the above-described prior art placement process, in which APTS is employed.

SUMMARY

The present invention provides a method in which carbon nanotubes can be selectively placed on a predetermined substrate surface, while avoiding the problems associated with the prior art APTS-based placement process. In particular, the present invention provides a method in which functionalized carbon nanotubes, which are capable of selectively bonding to metal oxides, are used for selectively placing carbon nanotubes onto a predetermined substrate surface that comprises metal oxide(s). The method of the present invention does not include the formation of a silanized surface for placing the carbon nanotubes, as is the case in the prior art process described above. Instead, bifunctional organic compounds are employed for forming functionalized carbon nanotubes, followed by selective placement of the functionalized carbon nanotubes on metal oxide surfaces.

One aspect of the present invention relates to a method of selective placement of carbon nanotubes on a substrate surface, comprising:

contacting carbon nanotubes with an organic compound that comprises at least first and second functional groups, wherein the first functional group is capable of forming covalent bonds with carbon nanotubes, and wherein the second functional group is capable of selectively bonding to metal oxides, to form functionalized carbon nanotubes having the organic compound covalently bound thereto via the first functional group; and contacting the functionalized carbon nanotubes with a substrate surface, wherein at least one portion of the substrate surface comprises a metal oxide, and wherein the second functional group of the organic compound selectively bonds to the metal oxide, thereby selectively placing the functionalized carbon nanotubes on the at least one portion of the substrate surface comprising the metal oxide.

Preferably, the first functional group of the organic compound comprises at least one aromatic or heteroaromatic functional moiety having from about 1 to about 12 rings and bearing at least one diazonium ($-N_2^+$) salt substituent. More preferably, the first functional group of the organic compound contains a phenyldiazonium salt functional moiety.

The second functional group preferably comprises at least one organic acid functional moiety, which can selectively bond to metal oxides. More preferably, the organic acid functional moiety is selected from the group consisting of carboxylic acids, hydroxamic acids, and phosphonic acids, and most preferably, the organic acid functional moiety is $-COOH$, $-C(O)NHOH$, or $-PO(OH)_2$.

The first and second functional groups of the organic compound can be linked together in any suitable manner. For example, such functional groups can be linked together via a single covalent bond. In another example, such functional groups can be linked together by a linker having from about 0 to about 20 carbon atoms. Such a linker can have any suitable configuration, e.g., linear, branched, or cyclic. Preferably, but not necessarily, the first and second functional groups are linked together by a linker selected from the group consisting of —O—, —S—, —NH—, $C_1$-$C_{20}$ alkyl, halogenated or partially halogenated $C_1$-$C_{20}$ alkyl, $C_1$-$C_{20}$ alkyloxy, $C_1$-$C_{20}$ alkylthiol, $C_1$-$C_{20}$ alkylamino, $C_1$-$C_{20}$ cycloalkyl, $C_1$-$C_{20}$ cycloalkyloxy, $C_1$-$C_{20}$ alkenyl, halogenated or partially halogenated $C_1$-$C_{20}$ alkenyl, $C_1$-$C_{20}$ alkenyloxy, $C_1$-$C_{20}$ alkenylthiol, $C_1$-$C_{20}$ alkenylamino, $C_1$-$C_{20}$ cycloalkenyl, $C_1$-$C_{20}$ cycloalkenyloxy, $C_1$-$C_{20}$ alkyl, and $C_1$-$C_{20}$ alkyloxy.

In several particularly preferred embodiments of the present invention, the organic compounds used for forming the functionalized carbon nanotubes are selected from the group consisting of:

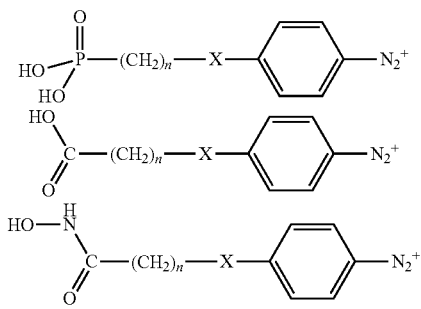

wherein n ranges from about 0 to about 20, and wherein X either is a single bond or is selected from the group consisting of O, S, and NH.

The substrate surface, as used in the present invention, preferably comprises at least one portion that is coated with a metal oxide layer containing aluminum oxide and/or hafnium oxide, said metal oxide layer having a thickness ranging from about 1 nm to about 100 nm. Specifically, the substrate surface may comprise either an unpatterned metal oxide layer, or a patterned metal oxide region that is located adjacent to or on top of a $SiO_2$ region.

The functionalized carbon nanotubes of the present invention are preferably dispersed in a solvent system that comprises one or more aqueous or organic solvents to first form a dispersion, which is then contacted with the substrate surface in a suitable manner to allow bonding between the functionalized carbon nanotubes and the metal oxide on the substrate surface.

Subsequently, excess functionalized carbon nanotubes, which have not bonded to the metal oxide, can be removed from the substrate surface by any suitable means. For example, the substrate surface can either be washed with one or more clean solvents, or be sonicated in one or more clean solvents. The term "clean" as used herein refers to solvent or solvents that is/are essentially free of functionalized carbon nanotubes.

Since the functionalized carbon nanotubes have electrical and physical properties that are significantly different from pristine carbon nanotubes, it is preferred that additional processing steps are carried out to "defunctionalize" the selectively placed carbon nanotubes and to restore their superior electrical and physical properties, before such carbon nanotubes are used for forming nano-sized electronic devices.

Specifically, the substrate surface is annealed at an elevated temperature for an appropriate period of time, so as to remove the organic compound from the functionalized carbon nanotubes and to form pristine (i.e., clean) carbon nanotubes. The pristine carbon nanotubes so formed are selectively placed on the at least one portion of the substrate surface containing the metal oxide, with little or no organic contamination. The annealing can be conducted, for example, in a nitrogen-containing environment, and the annealing temperature may range from about 450° C. to about 650° C. More preferably, the annealing temperature ranges from about 500° C. to about 600° C. The annealing can be carried out for from about 60 seconds to about 120 minutes, and more preferably from about 120 seconds to about 60 minutes.

After formation of the pristine carbon nanotubes, source and drain contacts can be readily deposited over the substrate surface by the well known methods, to form field effect transistors that comprises the carbon nanotubes as channels. In a specific embodiment of the present invention, the source and drain contacts are deposited by lithographic techniques.

In another aspect, the present invention relates to a composition that comprises one or more functionalized carbon nanotubes. Each functionalized carbon nanotube of the present invention has an organic compound covalently bound thereto, wherein the organic compound comprises at least first and second functional groups, wherein the first functional group is capable of forming covalent bonds with carbon nanotubes, and wherein the second functional group is capable of selectively bonding metal oxides.

Preferably, but not necessarily, the functionalized carbon nanotubes have the following formula:

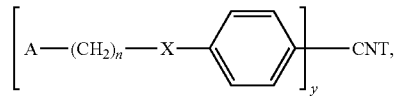

wherein A is an organic acid functional moiety selected from the group consisting of —COOH, —C(O)NHOH, and —PO(OH)$_2$, wherein n ranges from about 0 to about 20, wherein y≧1, wherein X either is a single bond or is selected from the group consisting of O, S, and NH, and wherein CNT is a carbon nanotube.

In a further aspect, the present invention relates to an organic compound comprising at least first and second functional groups, wherein the first functional group is capable of forming covalent bonds with carbon nanotubes, and wherein the second functional group is capable of selectively bonding metal oxides.

In a still further aspect, the present invention relates to an organic precursor compound having a formula selected from the group consisting of:

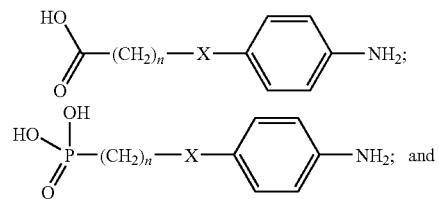

-continued

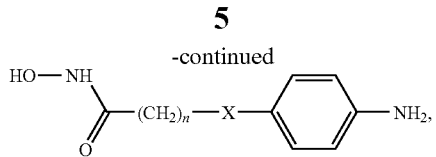

wherein n ranges from about 0 to about 20, and wherein X either is a single bond or is selected from the group consisting of O, S, and NH.

Such an organic precursor compound can be used to form the organic compound as described hereinabove, which can, in turn, be used to form the functionalized carbon nanotubes.

Other aspects, features and advantages of the invention will be more fully apparent from the ensuing disclosure and appended claims.

BRIEF DESCRIPTION OF THE DRAWINGS

FIG. 3 shows selective bonding of the functionalized carbon nanotube of FIG. 2 to a substrate surface that contains metal oxide.

DETAILED DESCRIPTION

Figure 1:
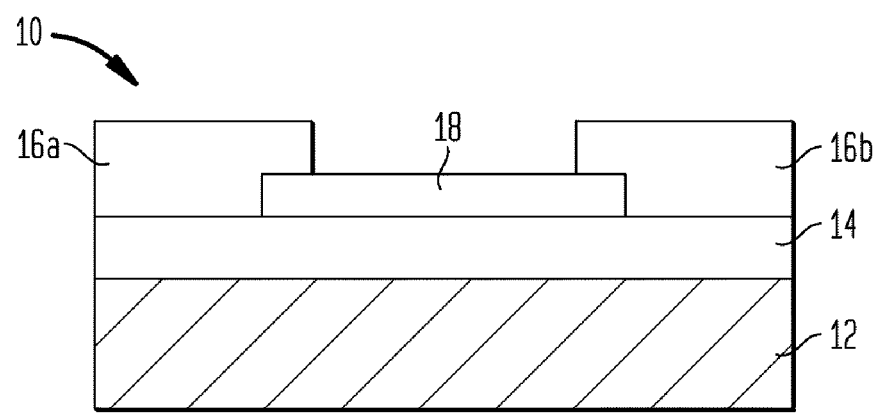
FIG. 1 is a cross-sectional view of an exemplary prior art back gate field effect transistor (FET).

In the following description, numerous specific details are set forth, such as particular structures, components, materials, dimensions, processing steps and techniques, in order to provide a thorough understanding of the present invention. However, it will be appreciated by one of ordinary skill in the art that the invention may be practiced without these specific details. In other instances, well-known structures or processing steps have not been described in detail in order to avoid obscuring the invention.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present invention provides a selective placement method for carbon nanotubes (CNTs) based on their functionalization, rather than the modification of the substrate surface.

The term "carbon nanotube" is used throughout the present application to include a one-dimensional nanomaterial that has a hollow cavity with nanometer-sized diameters and much, much longer lengths. In other words, the carbon nanotubes have a high aspect ratio and quantum effects become important for these systems. The nanotubes that can be used in the present invention are single walled or multi-walled nanomaterials that typically have an outer diameter that is typically from about 0.8 nm to about 30 nm, with an outer diameter from about 1.0 nm to about 2.5 nm being more typical, and a length that is typically from about 5 nm to about 100 μm, with a length from about 10 nm to about 10 μm being more typical. In addition to having an outer diameter, the nanotubes that can be used in the present invention have an inner diameter that is typically from about 0.8 nm to about 15 nm, with an inner diameter from about 0.8 nm to about 2.5 nm being more highly typical. The nanotubes useful in the present invention are further characterized as having a high aspect ratio that is typically on the order of about 5 or greater, with an aspect ratio from about 5 to about 5000 being typical.

The nanotubes formed include a C-based nanomaterial that has a hexagonal lattice structure that is rolled up.

The carbon nanotubes used in the present invention are made using techniques well known to those skilled in the art. For example, the carbon nanotubes can be formed by laser ablation, chemical vapor deposition (CVD) of various organic materials, such as carbon monoxide, methane, and ethanol, and electrical discharge.

One embodiment of the present invention involves forming functionalized carbon nanotubes by using a group of novel bifunctional organic compounds that have been designed and synthesized by the inventors of the present invention. Specifically, each of such organic compounds contains at least two functional groups, the first of which can form covalent bond with carbon nanotubes, and the second of which can bond selectively to metal oxides, but not to silicon oxide. Such bifunctional organic compounds, after being covalently bonded to carbon nanotubes via their first functional groups, effectively functionalize such carbon nanotubes with their metal-oxide-bonding second functional groups. Therefore, the carbon nanotubes so functionalized can selectively bond to substrate surfaces that contain metal oxides (via the second functional groups of the organic compounds), but not to substrate surfaces that contain silicon oxide. Excess carbon nanotubes that have not formed selective bonds with the metal oxides can then be removed from the substrate surface.

The first functional group of the organic compounds of the present invention can comprise an aromatic or heteroaromatic functional moiety having at least one diazonium salt substituent, with or without additional substituent(s). The aromatic or heteroaromatic ring of this first functional group can form a carbon-carbon single bond with a carbon nanotube with the assistance of the at least one diazonium salt substituent, thereby covalently bonding such an organic compound to the carbon nanotube.

Preferably, the aromatic or heteroaromatic functional moiety has from about 1 to about 12 rings. The heteroaromatic functional moiety can include one of the following as the heteroatom: nitrogen, sulfur, oxygen or combinations thereof. The aromatic or heteroaromatic functional moiety contains a diazonium salt substituent ($-N_2^+$), which can react with a carbon nanotube to facilitate the formation of the carbon-carbon single bond between the carbon nanotube and the aromatic or heteroaromatic ring.

More preferably, the first functional group may comprise an aryldiazonium functional moiety ($-Ar-N_2^+$) or a substituted aryldiazonium functional moiety with one or more additional substituents. Most preferably, the first functional group comprises a phenyldiazonium moiety or a substituted phenyldiazonium moiety with at least one alkyl substituent, as follows:

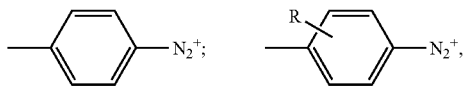

wherein R is an alkyl group with from about 1 to about 12 carbon atoms.

The aryldiazonium functional moiety, as mentioned hereinabove, can be readily formed using a precursor organic compound that contains an aminoaryl functional moiety ($-Ar-NH_2$), which can react with nitrosonium tetrafluoroborate ($NO^+BF_4^-$) in acetonitrile to form a corresponding aryldiazonium tetrafluoroborate ($-Ar-N_2^+BF_4^-$) functionality.

The second functional group of the organic compounds of the present invention can comprise any suitable organic acid functional moiety that can bond to metal oxides in selection to silicon oxide. Preferably, but not necessarily, the second functional group comprises a functional moiety selected from the group consisting of carboxylic acids, hydroxamic acids, and phosphonic acids.

The first and second functional groups of the organic compounds can either be directly linked together by a single covalent bond, or be linked together by a linker, which can comprise from 0 to 20 carbon atoms and which can be linear, branched, or cyclic. Preferably, the first and second functional groups of the organic compounds are linked together by a linker selected from the group consisting of $-O-$, $-S-$, $-NH-$, $C_1$-$C_{20}$ alkyl, halogenated or partially halogenated $C_1$-$C_{20}$ alkyl, $C_1$-$C_{20}$ alkyloxy, $C_1$-$C_{20}$ alkylthiol, $C_1$-$C_{20}$ alkylamino, $C_1$-$C_{20}$ cycloalkyl, $C_1$-$C_{20}$ cycloalkyloxy, $C_1$-$C_{20}$ alkenyl, halogenated or partially halogenated $C_1$-$C_{20}$ alkenyl, $C_1$-$C_{20}$ alkenyloxy, $C_1$-$C_{20}$ alkenylthiol, $C_1$-$C_{20}$ alkenylamino, $C_1$-$C_{20}$ cycloalkenyl, $C_1$-$C_{20}$ cycloalkenyloxy, $C_1$-$C_{20}$ alkyl, and $C_1$-$C_{20}$ alkyloxy. More preferably, the linker is a linear $C_1$-$C_{20}$ alkyloxy, and most preferably, the linker is either an undecyloxy or a dodecyloxy.

Particularly preferred organic compounds of the present invention are:

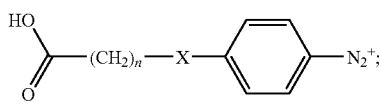

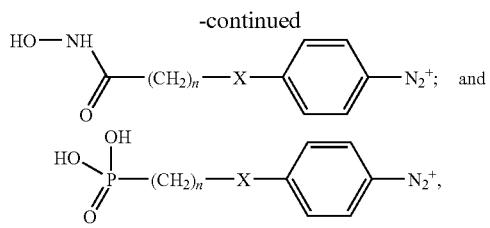

wherein n ranges from about 0 to about 20, and wherein X either is a single bond or is selected from the group consisting of O, S, and NH.

These preferred organic compounds can be readily formed from the following precursor compounds:

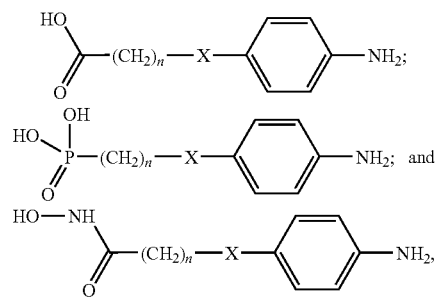

by reacting the precursor compounds with nitrosonium tetrafluoroborate ($NO^+BF_4^-$) in acetonitrile.

Figure 2:
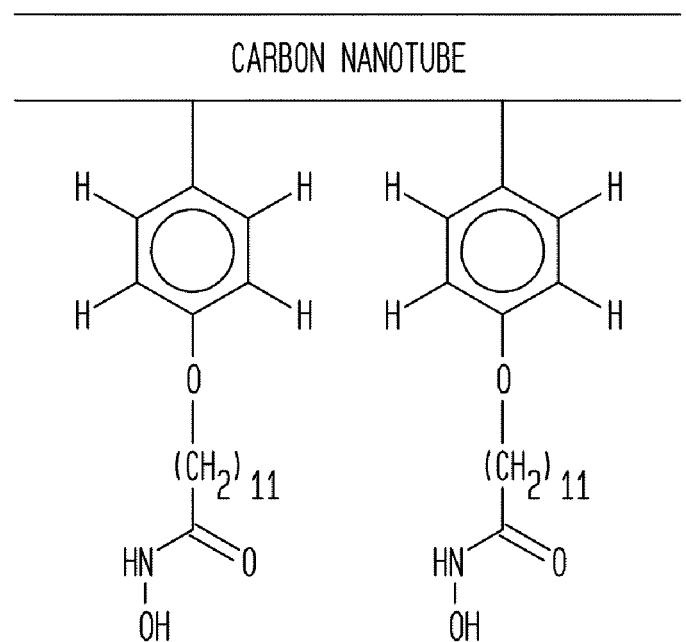
FIG. 2 shows a functionalized carbon nanotube with 11-phenoxy-1-undecylhydroxamic acid covalent bonded thereto, according to one embodiment of the present invention.

The organic compounds as described hereinabove are then contacted with carbon nanotubes to form functionalized carbon nanotubes with the organic compounds covalently bonded thereto. FIG. 2 illustratively shows a functionalized carbon nanotube with two 11-phenoxy-1-undecylhydroxamic acid molecules covalent bonded thereto.

In a particularly preferred embodiment of the present invention, the functionalized carbon nanotubes are dispersed in one or more aqueous or organic solvents, to form a dispersion of carbon nanotubes. The dispersion can be readily prepared using techniques that are well known in the art. Typically, the dispersion is prepared by sonication of carbon nanotubes in an organic solvent (such as, for example, $C_1$-$C_3$ alcohols, dichloroethylene, N-methylpyrolidone or dichloromethane) or in an aqueous solution that contains from about 0.1 to about 1% of a surfactant. Examples of surfactants that can be used in preparing the aqueous dispersion of carbon nanotubes include sodium dodecylbenzenesulfonic acid (SDS) and poly(oxyethylene)-substituted aromatic compounds such as Triton N-100 or Triton X-100.

The functionalized carbon nanotubes can then be contacted with a substrate surface that comprises at least one portion containing metal oxides. When a dispersion of the functionalized carbon nanotubes has been provided, the substrate surface can be simply immersed in such a dispersion for a sufficient period of time to allow the second functional groups of the covalently bonded organic compounds to selectively bond to the metal oxides. In this manner, the functionalized nanotubes are selectively placed on the metal-oxide-containing portion of the substrate surface. FIG. 3 illustratively shows selective bonding of the functionalized carbon nanotube of FIG. 2 to a substrate surface that contains metal oxide.

The metal oxide of the present invention includes at least one metal from group IVB, VB, VIB, VIIB, VIII or IIA (CAS version) of the Periodic Table of Elements. More preferably, the metal oxide of the present invention is selected from $Al_2O_3$, $HfO_2$, $TiO_2$, $SnO_2$ or $ZrO_2$. The metal oxide 10 may be located atop another dielectric material or a semiconducting material.

The substrate surface may comprise either a uniform, unpatterned metal oxide layer, or a patterned metal oxide region located adjacent to or on top of a $SiO_2$ region. Preferably, the substrate surface comprises a metal oxide layer over at least one portion thereof, while the metal oxide layer comprises aluminum oxide and/or hafnium oxide and has a thickness ranging from about 1 nm to about 100 nm.

After the selective placement of the functionalized carbon nanotube, excess functionalized carbon nanotubes that have not yet bonded to the metal oxides are removed from the substrate surface. The removal can be carried out by any suitable methods. For example, the substrate surface can be washed with one or more clean solvents, or it can be sonicated in one or more clean solvents.

Figure 4A:
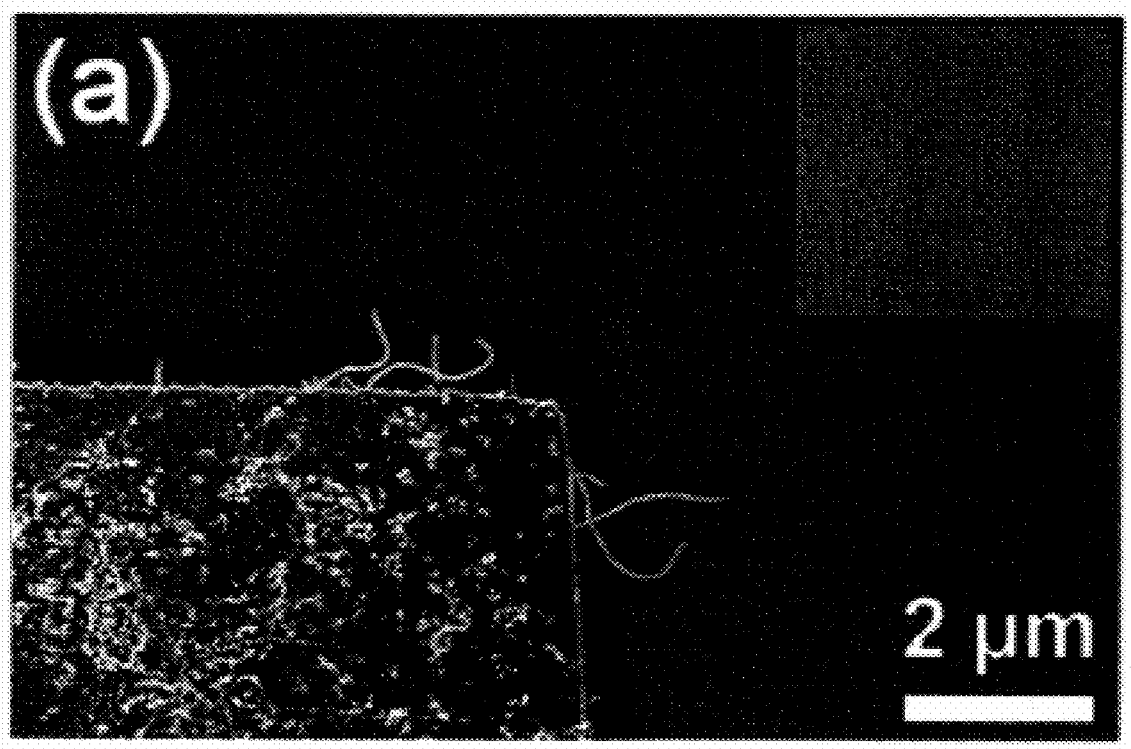
FIG. 4(A) is a scanning electron microscopic (SEM) photograph that shows functionalized carbon nanotubes that are selectively bonded to a patterned $Al_2O_3$ region on a substrate surface.
Figure 4B:
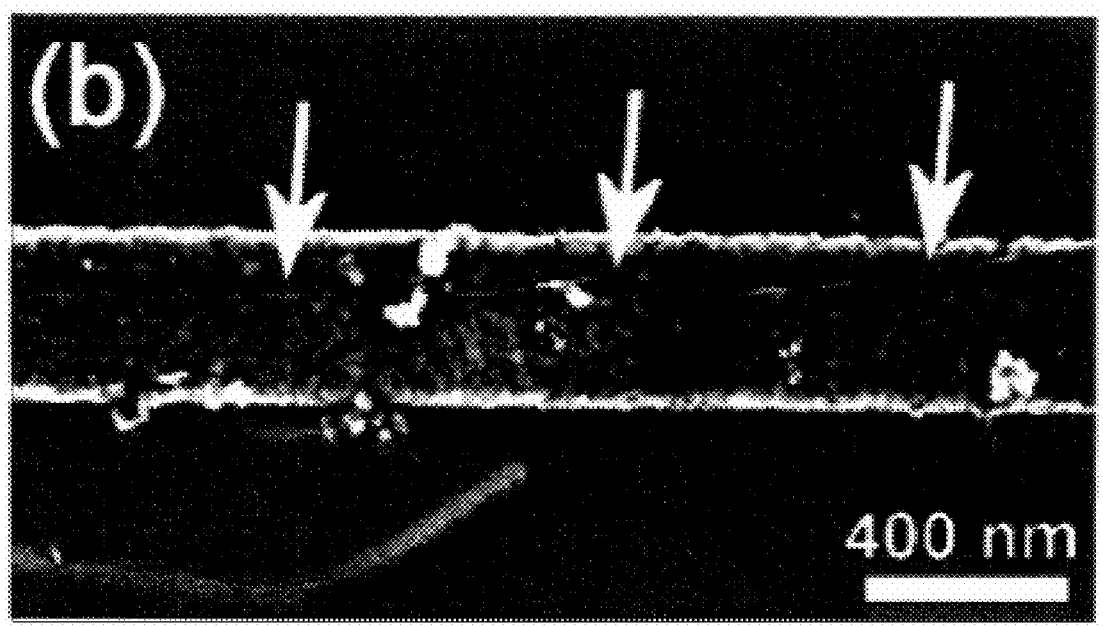
FIG. 4(B) is a SEM photograph showing a functionalized carbon nanotube that is not only selectively bonded to, but also aligned with, a thin strip of $Al_2O_3$ on a substrate surface.

The selective placement method as proposed by the present invention not only achieves excellent site-specific bonding of the functionalized carbon nanotubes to the metal-oxide-containing surface regions, but also can be used to align the functionalized carbon nanotubes to the contours of narrow metal-oxide-containing surface features. FIG. 4(A) shows a SEM photograph of functionalized nanotubes (the thin white threads) that have been selectively deposited onto a $SiO_2$ substrate with a patterned $Al_2O_3$ surface region. The patterned $Al_2O_3$ region has a dense nanotube layer, but other regions of the silicon oxide substrate do not contain any adsorbed nanotubes. FIG. 4(B) shows a SEM photograph of a $SiO_2$ substrate with a narrow $Al_2O_3$ strip thereon, while a functionalized nanotube (pointed to by the white arrowheads) has been selectively placed on the narrow $Al_2O_3$ strip in a substantially aligned manner.

Following selective placement of the functionalized carbon nanotubes, additional processing steps can then be performed to remove the covalently bonded organic compound, thereby "defunctionalize" the carbon nanotubes and restore their superior physical and electrical properties.

One important advantage of the present invention is that the functionalized carbon nanotubes can be converted into pristine carbon nanotubes by annealing, with little or no impact on their physical and electrical properties.

Figure 5A:
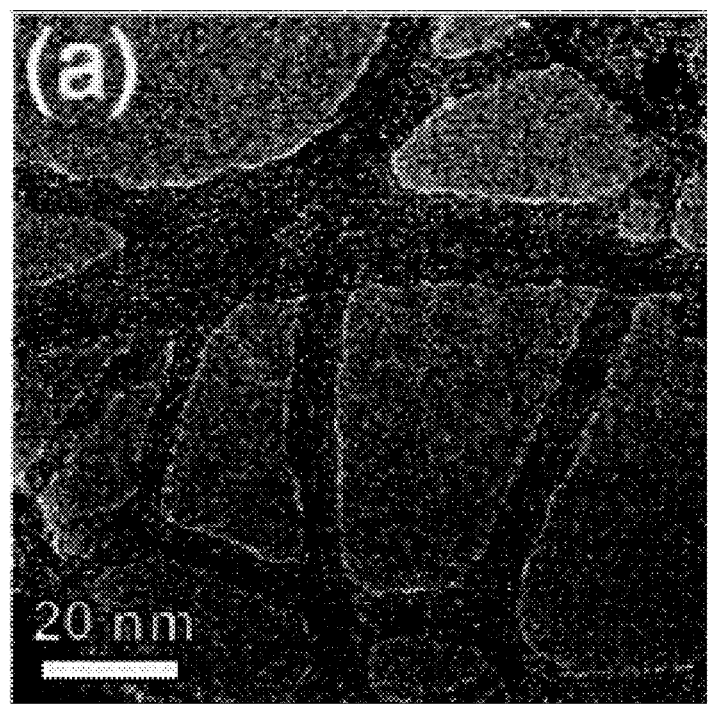
FIG. 5(A) is a transmission electron microscopic (TEM) photograph that shows intact functionalized carbon nanotubes.
Figure 5B:
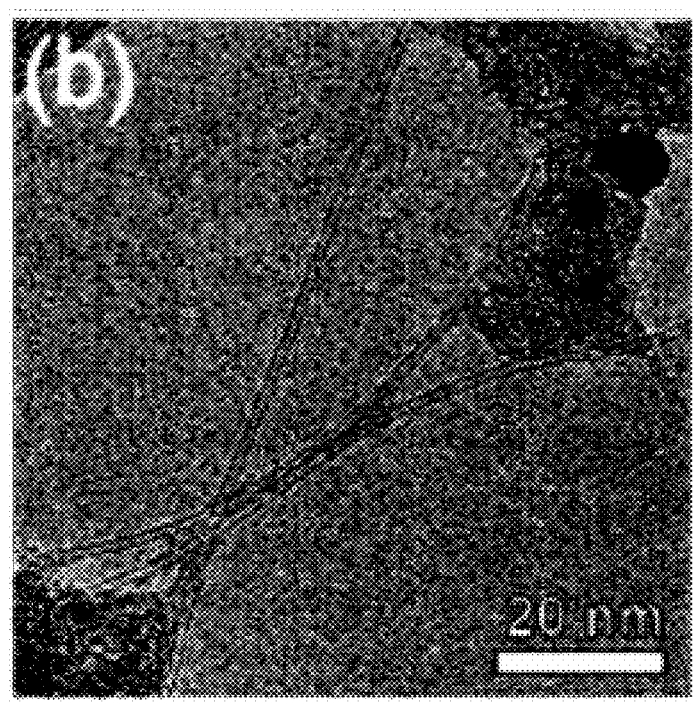
FIG. 5(B) is a TEM photograph that shows functionalized carbon nanotubes after annealing.

FIG. 5(A) shows the TEM photographs of carbon nanotubes that were uniformly and completely functionalized, which were dispersed in methanol on "holey" $SiO_2$ coated TEM grids. A dense, amorphous layer of organic compounds covered each carbon nanotubes.

However, after annealing in a nitrogen-containing environment at an annealing temperature from about 500° C. to about 600° C. for about 120 seconds to about 60 minutes, the amorphous layer disappeared, and the carbon nanotubes appeared remarkably clean, with little or no defects. The structural integrity of the nanotubes is maintained during the annealing process.

Atomic force microscopic (AFM) measurements (not shown here) further confirms that the annealing resulted in a complete removal of the organic compounds, with little or no residual contamination on the nanotube surfaces. Before the annealing, the average tube diameter was about 1.8 nm, and it reduced to about 1.0 nm after the annealing.

Figure 6:
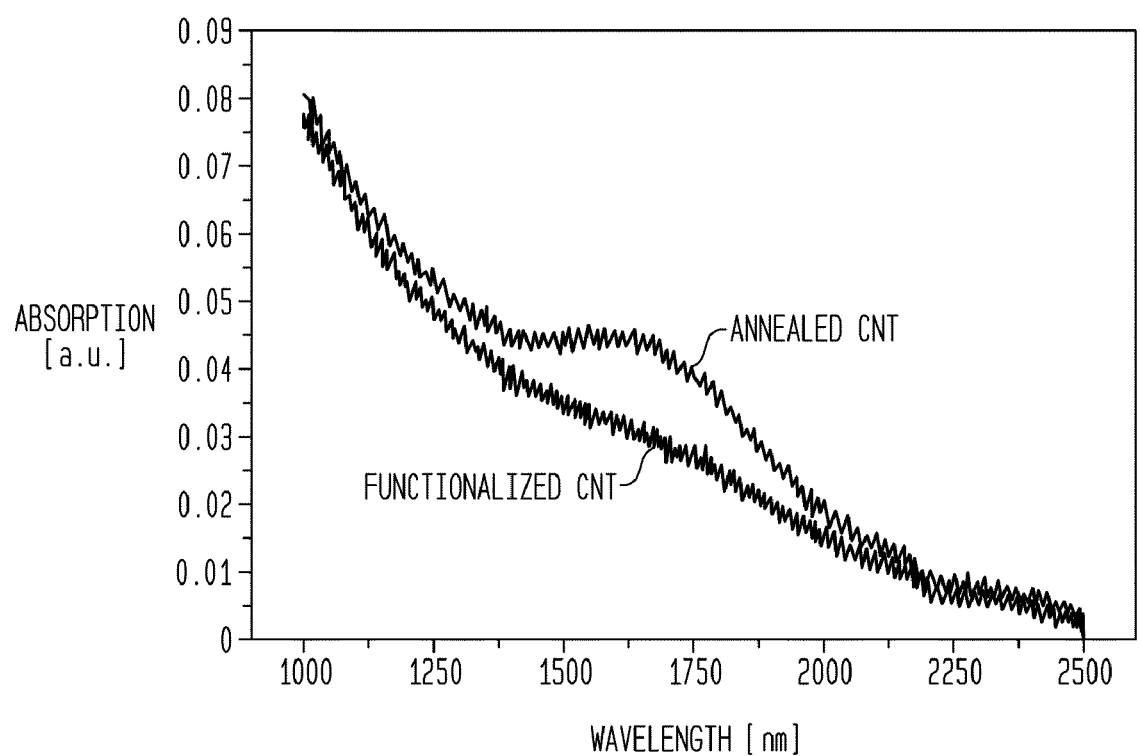
FIG. 6 shows the absorption spectra of a functionalized carbon nanotube before and after annealing.

Because the one-dimensional character of carbon nanotubes leads to the formation of strongly bound excited states. The lowest allowed exciton occurs in the infra-red region, which can be easily detected by using adsorption spectroscopy. FIG. 6 shows the absorption spectra of a functionalized carbon nanotube before and after annealing. The spectrum recorded for the functionalized carbon nanotube before annealing was featureless, indicating that the band structure of the functionalized nanotube is very different from that of a pristine (or clean) nanotube. However, after annealing, a broad adsorption band around 1650 nm appeared, associated with the first dipole active exciton. The broad shape of the absorption peak is due to the presence of a distribution of nanotubes in the sample, with diameters ranging from about 0.8 nm to about 1.2 nm. The appearance of this band upon annealing indicates that the one-dimensional band structure of the nanotube is restored, most likely because the covalent bonds between the nanotubes and the organic compounds were broken by the annealing. The spectra obtained for the functionalized carbon nanotubes after annealing are similar to those obtained for pristine nanotube samples.

The specific annealing conditions for practicing the present invention can be varied widely, depending on the specific types of carbon nanotubes used. For nanotubes with an average tube diameter ranging from about 0.8 nm to about 1.2 nm (measured before the functionalization), the annealing temperature may range from about 450° C. to about 650° C., more preferably from about 500° C. to about 600° C., and the annealing duration may range from about 60 seconds to about 120 minutes, and more preferably from about 120 seconds to about 60 minutes.

The selectively placed carbon nanotubes can then be used for fabricating nano-sized FETs or other electronic devices. For example, FET source and drain contacts can be deposited by lithography over the substrate surface in direct contact with the carbon nanotubes, so as to form FETs with carbon nanotube channels.

FIGS. 7(A)-7(E) shows exemplary processing steps for forming an FET with a carbon nanotube channel by using a functionalized carbon nanotube, according to one embodiment of the present invention.

Figure 7A:
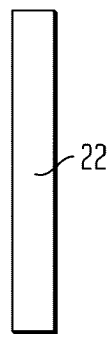
FIGS. 7(A)-7(E) shows exemplary processing steps for forming an FET with a carbon nanotube channel by using a functionalized carbon nanotube, according to one embodiment of the present invention.
Figure 7B:
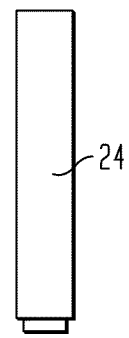
Figure 7C:
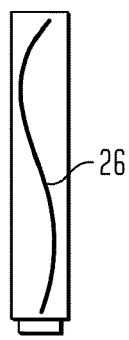
Figure 7D:
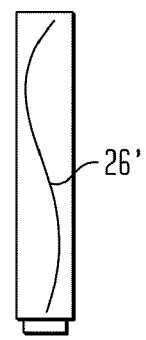
Figure 7E:
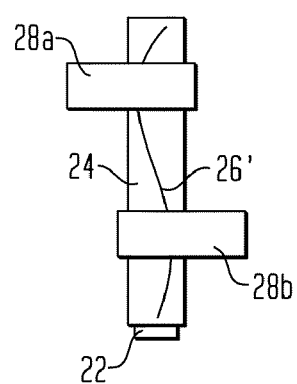

Specifically, a $SiO_2$ substrate 22 is provided, as shown in FIG. 7(A), which is then patterned with a narrow Al strip (not shown) of about 40 nm thick and 300 nm wide. The substrate 22 is then exposed to an oxygen plasma (e.g., for 3 minutes at 600 mTorr), so as to oxidize the surface of the Al strip, to form an $Al_2O_3$ surface layer 24, as shown in FIG. 7(B). The $Al_2O_3$ surface layer 24 protects the underlying Al material from being oxidized and also separates the underlying metal from the carbon nanotube to be deposited. A functionalized carbon nanotube 26 in accordance with the present invention is then selectively bonded to the $Al_2O_3$ surface layer 24, as shown in FIG. 7(C). Subsequent annealing in $N_2$ removes the organic compound from the functionalized carbon nanotube 26, thereby forming a pristine carbon nanotube 26' on the $Al_2O_3$ surface layer 24, as shown in FIG. 7(D). Finally, a lithographic step is carried out to deposit source and drain contacts 28(a) and 28(b) over the substrate 24 in direct contact with two ends of the carbon nanotube 26'. In this manner, a nano-sized FET device is formed, in which the unreacted Al metal functions as the back gate, the $Al_2O_3$ surface layer 24 functions as the gate dielectric, and the carbon nanotube 26' functions as the channel.

Figure 8:
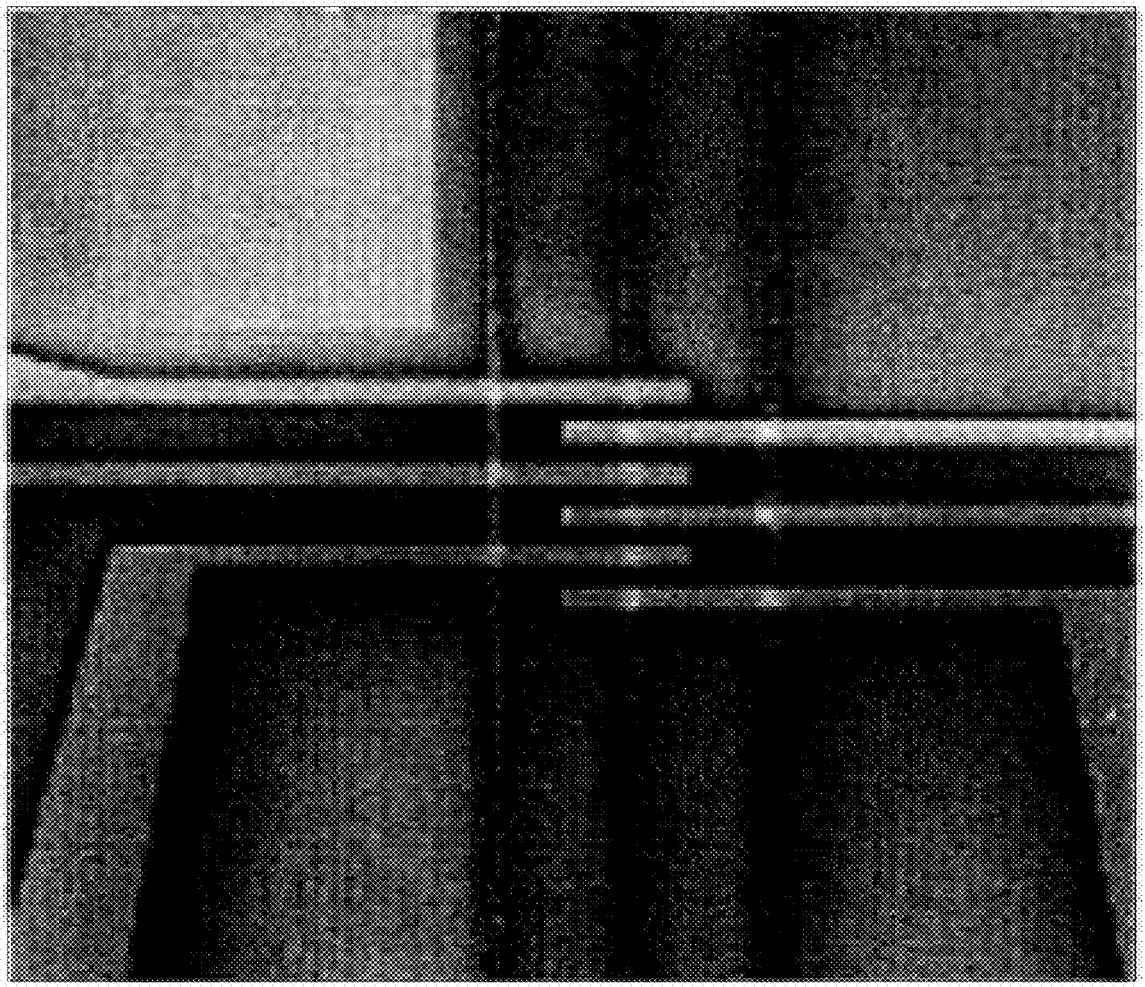
FIG. 8 shows a SEM photograph of FETs containing carbon nanotube channels and Pd leads.

FIG. 8 further shows a SEM photograph of actual FETs formed by a process similar to that described hereinabove. The vertical leads are $Al/Al_2O_3$ gate structures with nanotubes adsorbed thereon, and the horizontal leads are Pd contacts that are in direct contact with the carbon nanotubes.

The channel length of the FETs formed by the method of the present invention typically ranges from about 50 nm to about 1000 nm, more typically from about 100 nm to about 500 nm, and most typically from about 350 nm to about 450 nm.

The following examples are provided to illustrate the various processing schemes of the present invention for the selective placement of carbon nanotubes.

EXAMPLE 1

Figure 9:
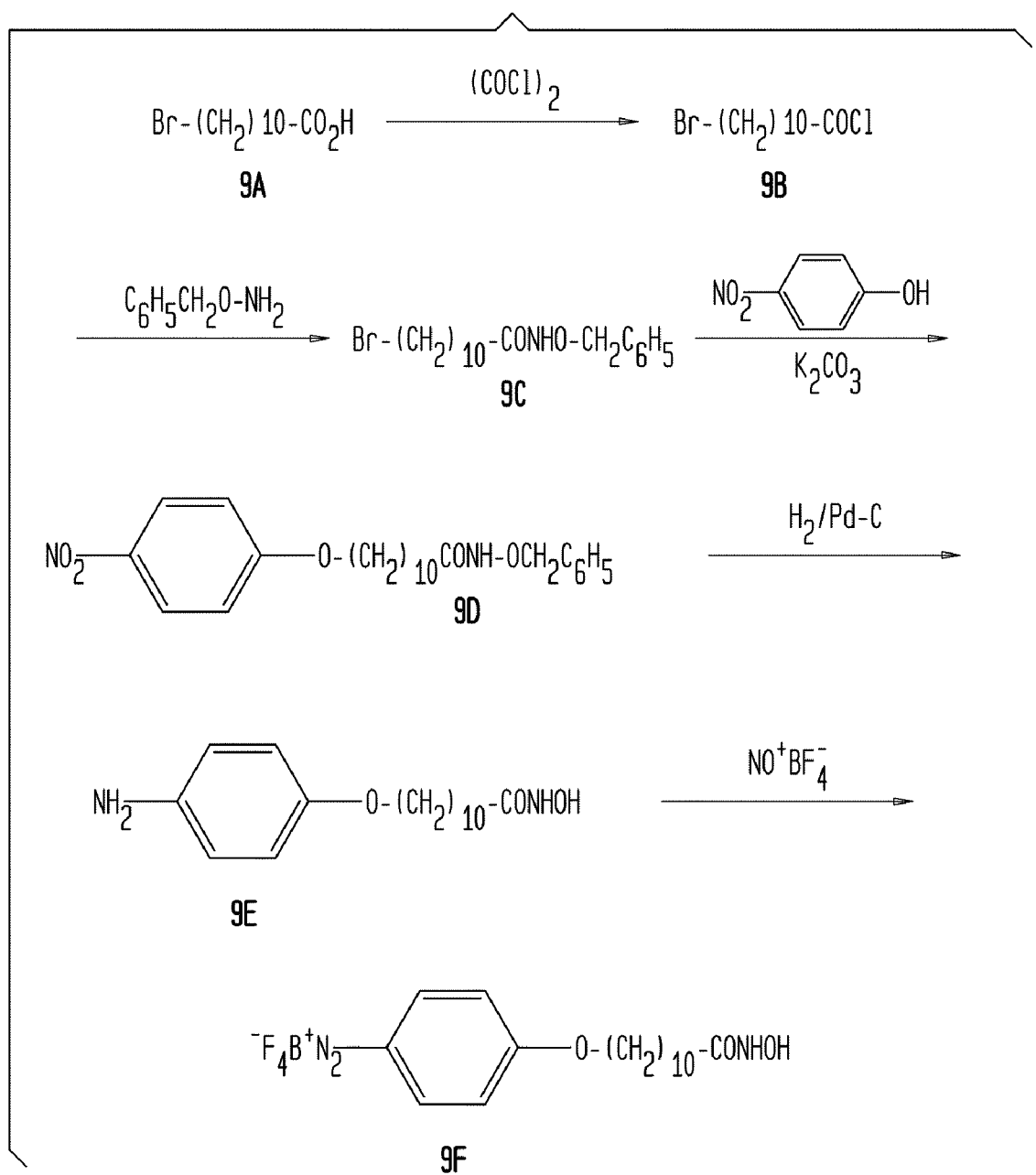
FIG. 9 illustrates a synthetic scheme for preparation of a bifunctional organic compound containing a hydroxamic acid moiety and a diazonium moiety.

Preparation of a Bifunctional Organic Compound with a Hydroxamic Acid Functional Moiety and a Diazonium Functional Moiety FIG. 9 shows the synthetic scheme for preparation of a bifunctional compound that comprises a hydroxamic acid moiety and a diazonium moiety. First, 11-bromo-1-undecanoic acid (9a) is converted to corresponding acid chloride (9b), which is then reacted with O-benzylhydroxylamine to form O-benzyl-10-bromodecylhydroxamic acid (9c). Reaction of 9c with 4-nitrophenol in the presence of potassium carbonate results in the formation of O-benzyl-10-(4-nitrophenoxy)decylhydroxamic acid (9d). Hydrogenation of 9d forms 10-(4-aminophenoxy)decylhydroxamic acid (9e), which reacts with nitrosonium tetrafluoroborate in acetonitrile to form the compound 9f, which contains a diazonium salt moiety at one end and a hydroxamic acid moiety at the other end.

In a specific experiment, oxallyl chloride (0.02 mole) was added to a solution of 0.01 mole 10-bromo-1-decanoic acid (9a) in dichloromethane containing traces of N,N-dimethylformamide and stirred for 4 hours. Excess oxallyl chloride was removed under reduced pressure, and the remaining oily acid chloride was dissolved in 50 mL dichloromethane and added to a solution of O-benzylhydroxylamine in dichloromethane containing 0.01 mole of triethylamine and the mixture was stirred at room temperature. The mixture was washed with dilute hydrochloric acid and brine, dried over anhydrous magnesium sulfate and the solvent was removed under reduced pressure to give desired protected hydroxamic acid (i.e., O-benzyl-10-bromodecylhydroxamic acid of 9c). Crystallization from ethanol afforded pure sample of 9c.

Potassium carbonate (5.0 grams) was added to a solution of 4-nitrophenol (0.01 mole) and the compound 9c (0.01 mole) in N,N-dimethylformamide (10 mL) and the mixture was heated at 110° C. under nitrogen for 18 hours. The mixture was cooled to room temperature. Water (100 mL) was added and extracted with diethyl ether. The ether extract was washed with dilute potassium hydroxide solution, brine and dried over anhydrous magnesium sulfate and evaporated under reduce pressure. The solid residue was crystallized from toluene to give the compound 9d (i.e., O-benzyl-10-(4-nitrophenoxy)decylhydroxamic acid) as light yellow crystals.

Palladium on carbon (10%, 200 mg) was added under nitrogen to a solution of the compound 9d (0.01 mole) and ammonium formate (0.05 mole) in anhydrous methanol (50 mL), and the mixture was heated to reflux for 4 hours. The solution was filtered, and the solvent was removed to give form the compound 9e (10-aminophenoxy-1-decylhydroxamic acid) as white crystalline compound.

EXAMPLE 2

Figure 10:
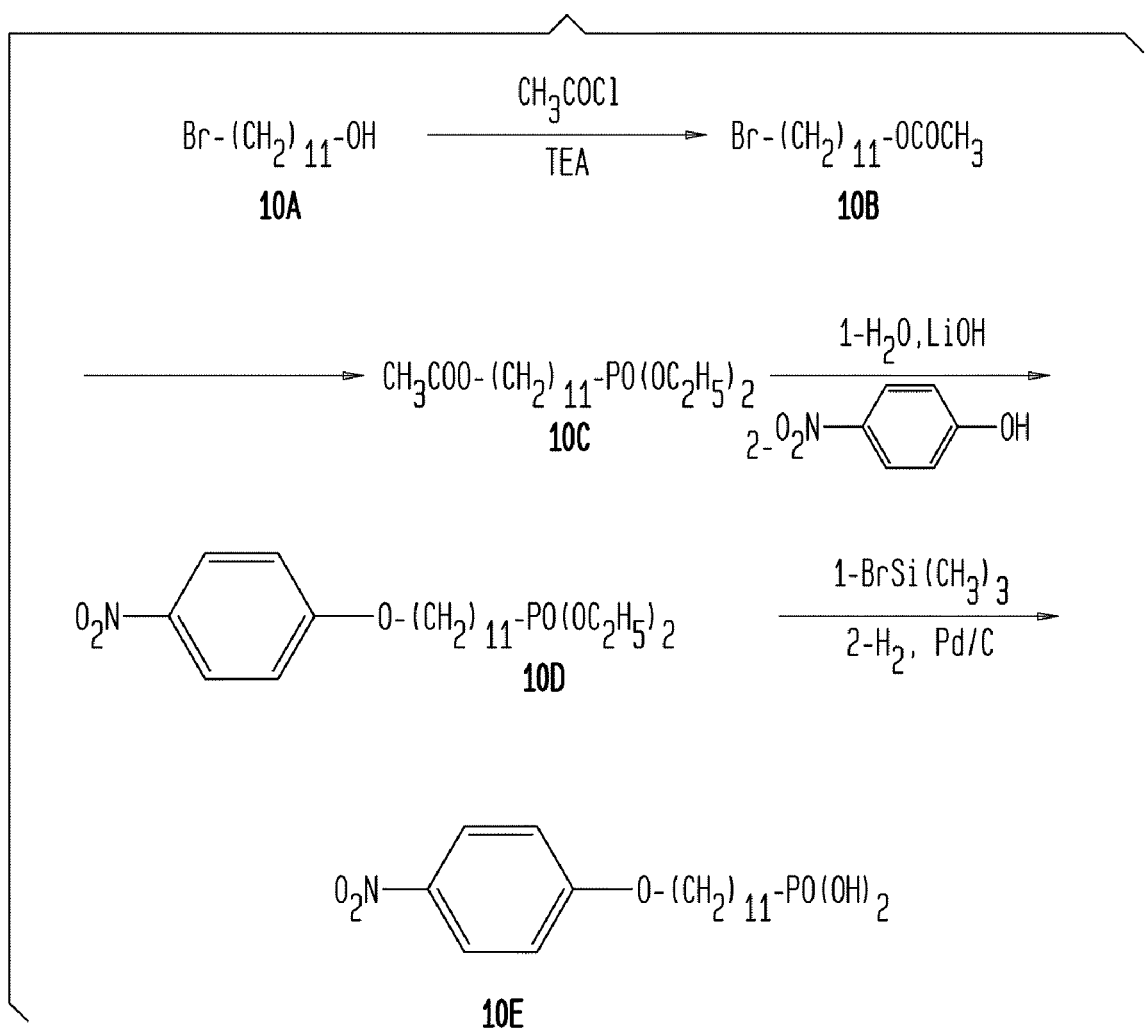
FIG. 10 shows a synthetic scheme for preparation of a bifunctional organic compound containing a phosphonic acid moiety and a diazonium moiety.

Preparation of a Bifunctional Organic Compound with a Phosphonic Acid Functional Moiety and a Diazonium Functional Moiety FIG. 10 shows the synthetic scheme for preparation of a bifunctional compound that comprises a phosphonic acid moiety and a diazonium moiety. First, 11-Bromo-1-undecanol (10a) is esterified with acetyl chloride and then reacted with triethylphosphite to form the phosphonate (10c). Deprotection of acetyl group and reaction of 4-nitrophenol in the presence of triphenyl phosphine and diethyl azodicarboxylate results in the formation of 11-nitrophenoxyundecyl phosphonate (10d). Reduction of nitro group to amine and hydrolysis of phosphonate to phosphonic acid then form O-benzyl 11-(4-nitrophenoxy)undecylphosphonic acid (10e). Hydrogenation of 10e can then form 11-(4-aminophenoxy)undecylhydroxamic acid (not shown), which in turn reacts with nitrosonium tetrafluoroborate in acetonitrile to form a compound (not shown) that contains a diazonium salt moiety at one end and a phosphonic acid moiety at the other end.

EXAMPLE 3

Preparation of a Dispersion of Functionalized Carbon Nanotubes

A solution of the compound 9e (60 mg) in anhydrous acetonitrile was added to a cold solution of nitrosonium tetrafluoroborate (18 mg) in anhydrous acetonitrile, and the mixture was stirred at room temperature. The yellow solution was added to a dispersion of carbon nanotubes in 1% aqueous sodium dodecylsulfonate and stirred at room temperature for 18 hours. The diazonium salt of 10-(4-aminophenoxy)-1-decylhydroxamic acid functionalized the carbon nanotubes by forming a covalent carbon-carbon bond with the carbon nanotube through the phenyl ring, without destroying the lattice structure of the carbon nanotubes.

The functionalized nanotubes were then isolated by addition of large amounts of acetone, followed by centrifugation. Supernatant liquid was discarded, and the precipitated carbon nanotubes were then dispersed in methanol to form stable dispersion of functionalized carbon nanotubes, which stayed isolated in the dispersion for several weeks.

EXAMPLE 4

Selective Bonding of Functionalized Carbon Nanotubes to Substrate Surface with Metal Oxide A $SiO_2$ substrate patterned with $Al_2O_3$ was first formed, by first depositing a patterned Al film over the substrate, followed by oxidizing the Al film using an oxygen plasma. The patterned $Al_2O_3$ layer was about 4 nm thick. The substrate was then immersed in a dispersion of functionalized carbon nanotubes in methanol, as described in EXAMPLE 3, and heated to 50° C. The substrate was subsequently removed from the dispersion and sonicated in clean methanol, followed by drying in a stream of nitrogen. A deposition of functionalized carbon nanotubes exclusively on aluminum oxide surface was resulted.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A composition comprising a dispersion of one or more functionalized carbon nanotubes having an organic compound covalently bound thereto in a solvent, wherein said organic compound comprises at least first and second functional groups, wherein the first functional group is capable of forming covalent bonds with carbon nanotubes, and wherein the second functional group is capable of selectively bonding metal oxides, wherein the functionalized carbon nanotubes have the following formula:

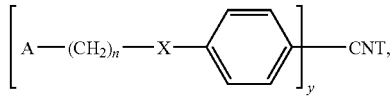

wherein A is an organic acid functional moiety selected from the group consisting of —C(O)NHOH, and —PO(OH)$_2$, wherein n ranges from about 0 to about 20, wherein y≧1, wherein X either is a single covalent bond or is selected from the group consisting of O, S, and NH, and wherein CNT is a carbon nanotube.

2. The composition of claim 1, wherein A is —C(O)NHOH.

3. The composition of claim 1, wherein A is —PO(OH)$_2$.

4. The composition of claim 1, wherein said solvent is aqueous.

5. The composition of claim 4, further comprising 0.1 to 1% of a surfactant.

6. The composition of claim 1, wherein said solvent is an organic solvent selected from the group consisting of C$_1$-C$_3$ alcohols, dichloroethylene, N-methylpyrolidone and diclhorosilane.

7. The composition of claim 1, wherein X is O.

8. The composition of claim 1, wherein X is S.

9. The composition of claim 1, wherein X is NH.

10. The composition of claim 1, wherein A is —C(O)NHOH, X is O and n equal 11.

11. The composition of claim 1, wherein A is —PO(OH)$_2$, X is O and n equal 11.

12. A composition comprising one or more functionalized carbon nanotubes, wherein the functionalized carbon nanotubes have the following formula:

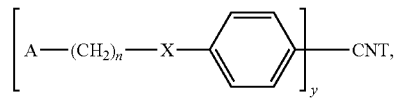

wherein A is an organic acid functional moiety selected from the group consisting of —C(O)NHOH, and —PO(OH)$_2$, wherein n ranges from about 0 to about 20, wherein y≧1, wherein X either is a single covalent bond or is selected from the group consisting of O, S, and NH, and wherein CNT is a carbon nanotube.

13. The composition of claim 12, wherein A is —C(O)NHOH, X is O and n equal 11.

14. The composition of claim 12, wherein A is —PO(OH)$_2$, X is O and n equal 11.

15. The composition of claim 12, wherein said functionalized carbon nanotubes are present as a dispersion within a solvent.

16. The composition of claim 12, wherein said solvent is aqueous.

17. The composition of claim 16, further comprising 0.1 to 1% of a surfactant.

18. The composition of claim 15, wherein said solvent is an organic solvent selected from the group consisting of C$_1$-C$_3$ alcohols, dichloroethylene, N-methylpyrolidone and diclhorosilane.

19. A composition comprising one or more functionalized carbon nanotubes, wherein the functionalized carbon nanotubes have the following formula:

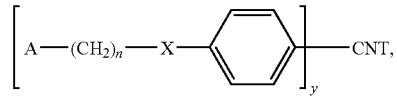

wherein A is —C(O)NHOH, wherein n ranges from about 0 to about 20, wherein y≧1, wherein X either is a single covalent bond or is selected from the group consisting of O, S, and NH, and wherein CNT is a carbon nanotube.

* * * * *